United States Patent [19]

Sieber

[11] Patent Number: 4,739,206
[45] Date of Patent: Apr. 19, 1988

[54] BASE ASSEMBLY FOR DYNAMO-ELECTRIC MACHINE

[75] Inventor: Robert L. Sieber, Fort Wayne, Ind.
[73] Assignee: General Electric Company, Fort Wayne, Ind.
[21] Appl. No.: 19,823
[22] Filed: Feb. 27, 1987
[51] Int. Cl.$^4$ ............................................. H02K 5/04
[52] U.S. Cl. ............................ 310/91; 29/596; 228/177; 248/676; 310/42
[58] Field of Search ............. 29/150, 426.4, DIG. 48, 29/596; 228/177; 248/676; 310/42, 89, 91

[56] References Cited

U.S. PATENT DOCUMENTS

| D. 196,797 | 11/1963 | Sleeter | D26/5 |
| 1,361,136 | 12/1920 | Burke | |
| 2,473,105 | 6/1949 | Luenberger | 172/36 |
| 3,501,660 | 3/1970 | Wightman et al. | 310/91 |

FOREIGN PATENT DOCUMENTS

| 1104045 | 4/1961 | Fed. Rep. of Germany | 310/89 |
| 941081 | 12/1948 | France | 310/89 |
| 2316849 | 3/1977 | France | |
| 59-89542 | 5/1984 | Japan | |
| 444799 | 3/1936 | United Kingdom | |

OTHER PUBLICATIONS

Oberg et al, "Machinery's Handbook", 21st Ed., Industrial Press, N.Y., p. 2218.

Primary Examiner—Patrick R. Salce
Assistant Examiner—D. L. Rebsch
Attorney, Agent, or Firm—Ralph E. Krisher, Jr.

[57] ABSTRACT

A base assembly for mounting a dynamo-electric machine on a planar mounting surface includes a generally rectangular metal sheet with flat foot portions and a cradle portion intermediate the foot portions. Leg portions of the metal sheet each incline upwardly from a corresponding foot portion to support the cradle portion a first preset height above the mounting surface. The foot portions are capable being drawn to increase the height of the cradle portion above the mounting surface to a second preset height, so that the axis of a rotor shaft of a motor supported by the base assembly will extend over the mounting surface at an increased height. The base assembly can also be detachably fixed to the machine shell by welding through selected mounting holes provided in the cradle portion, such that the welds can be released with a milling tool.

15 Claims, 3 Drawing Sheets

BASE ASSEMBLY FOR DYNAMO-ELECTRIC MACHINE

RELATIONSHIP TO OTHER APPLICATIONS

This application is being filed on the same day as commonly assigned applications DYNAMOELECTRIC MACHINE LAMINATION CONSTRUCTION in the name of Thomas W. Neumann, Ser. No. 20,297; CLOSED SLOT ROTOR CONSTRUCTION in the names of Deepakkumar J. Gandhi et al., Ser. No. 20,299; and LIP STRUCTURE FOR A STATOR IN A DYNAMOELECTRIC MACHINE in the names of Deepakkumar J. Gandhi et al., Ser. No. 19,811. The entire disclosures of all of these three (3) other applications are specifically incorporated herein by reference.

BACKGROUND OF THE INVENTION

1. Field of the Invention

The present invention relates generally to mounts or base assemblies for mounting dynamo-electric machines firmly on a flat mounting surface.

2. Description of the Known Art

Base assemblies which conform to an outer circumferential periphery of a dynamo-electric machine shell are known from, for example, U.S. Pat. Nos. 1,361,136 (Dec. 7, 1920) and 3,501,660 (Mar. 17, 1970) and Japanese Patent Document No. 59-89542 (May 23, 1984). The known assemblies are formed of sheet metal which is either welded to or press fitted against the exterior of the machine shell. In an arrangement disclosed in French Application No. 2,316,849 (Jan. 28, 1977) two interlocking sheet metal halves form a V, the upper ends of which are bolted to a motor. Opposite ends of the halves have openings to receive fastening elements to secure the assembly to a mounting surface.

The above known base assemblies are not, however, disclosed as being capable of allowing a machine shaft to be positioned at a selected one of two heights over the mounting surface, so as to comply with different industry standards, for example, those prescribed by the National Electric Manufacturers Association (NEMA) Publication No. MG1-1978, and those set out by International Electrotechnical Commission (IEC), Publication No. 72.

Specifically, although the dimensional standards prescribed by both the above organizations may be quite close to one another for a given machine of a certain power rating, it has been required to manufacture different base assemblies for the machines to conform to the machine casing or shell peripheries and, importantly, to support the shells a proper height over the mounting surface so that the axis of a rotor shaft of the machine will extend over the mounting surface at the height prescribed by the standard of interest.

Another problem arises in that, once the known sheet metal base assemblies are welded to the machine shell, it becomes difficult, if not impossible, to remove them from the machine in the event a different kind of mounting, e.g., a C-face or D-flange type end shield is to be substituted on the machine.

SUMMARY OF THE INVENTION

An object of the invention is to overcome the above and other shortcomings in the prior known machine base assemblies.

Another object of the invention is to provide a base assembly for mounting a dynamo-electric machine on a mounting surface, which can be adapted to support the machine at a selected height above the mounting surface.

Yet another object of the invention is to provide a detachable base arrangement in which a cradle portion of a base member is welded to the machine shell in a manner which allows the welds to be removed with relative ease without damage to the machine.

According to the invention, a base assembly for a dynamo-electric machine includes a generally rectangular integral metallic sheet comprising flat foot portions, a cradle portion intermediate the foot portions, and leg portions each inclined upwardly from a corresponding foot portion toward the axis of the machine shell and joining with ends of the cradle portion. The flat foot portions are capable of being drawn to increase the height at which an axial center line of an arcuate surface on the cradle portion is supported over the mounting surface. Accordingly, the axis of the machine rotor shaft will extend at a greater one of two different heights prescribed for the rotor axis, by e.g., industry standards.

According to another aspect of the invention, a detachable base arrangement for a dynamo-electric machine includes a cylindrical shell for surrounding a machine stator and having first mounting holes. A base member for mounting the machine on a mounting surface includes flat foot portions, a cradle portion intermediate the foot portions, and leg portions each inclined upwardly from a corresponding foot portion toward the axis of the shell and joining with ends of the cradle portion to support the cradle portion a prescribed height above the mounting surface. The cradle portion has a set of mounting holes for aligning with at least some corresponding mounting holes provided in the machine shell, and the cradle portion is welded to the shell through at least some of the mounting holes in the cradle portion in a manner to allow the welds to be cut with a milling tool and the cradle portion to be separated from the shell.

The various features of novelty which characterize the invention are pointed out with particularity in the claims annexed to and forming a part of the present disclosure. For a better understanding of the invention, its operating advantages and specific objects attained by its use, reference should be had to the accompanying drawing and descriptive matter in which there are illustrated and described preferred embodiments of the invention.

DESCRIPTION OF THE PREFERRED EMBODMENT

Figure 1:
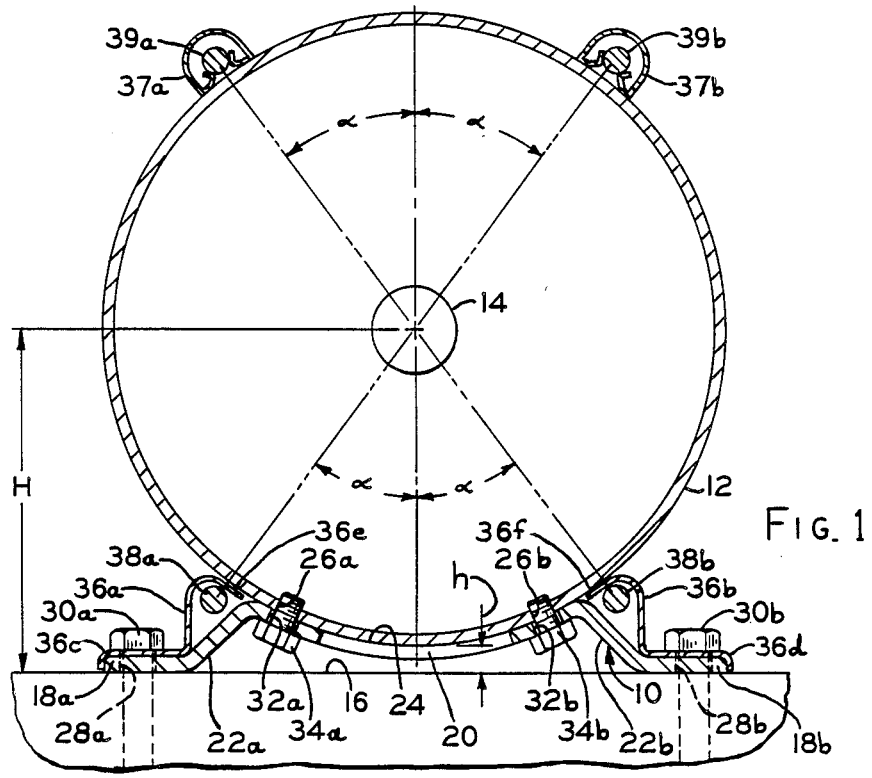
FIG. 1 is an end view, partly in section, of a base assembly according to the invention, supporting a shell of a dynamo-electric machine on a mounting surface.

FIG. 1 shows a base assembly 10 according to the invention, on which an outer casing or shell 12 of a dynamo-electric machine is mounted. The shell 12 is generally cylindrical in cross section, and the machine 10 includes a rotor shaft 14 coaxial with the shell 12 and arranged to extend parallel to and a certain height H above a mounting surface 16. The height H may be, for example, between 113.54 mm to 114.30 mm in the case of a type 182/184 FR NEMA Standard, and between 112 mm to 111.5 mm for a type 112S/112M FR IEC Standard.

Base assembly 10 is formed of a generally rectangular integral metallic sheet and includes foot portions 18a, 18b, a cradle portion 20 intermediate the foot portions 18a, 18b, and leg portions 22a, 22b, each inclined upwardly from a corresponding foot portion 18a, 18b, in a direction toward the axis of the shell 12, and joining into axially extending ends of the cradle portion 20.

The cradle portion 20 has an arcuate surface 24 which conforms to the portion of the outer circumference of the shell 12 which seats on the base assembly 10. The shell 12 has a set of first mounting holes 26a, 26b. The foot portions 18a, 18b, of the base assembly 10 have a set of second mounting holes 28a, 28b for receiving bolt member 30a, 30b which fix the flat foot portions 18a, 18b to the mounting surface 16. The mounting surface 16 has a bolt hole configuration, which conforms to one of the industry standards to which the base assembly 10 can be adapted.

A third set of mounting holes 32a, 32b are provided in the cradle portion 20 for alignment with at least some of the first set of mounting holes 26a, 26b in the machine shell 12. Bolts 34a, 34b are received through some of the third set of mounting holes 32a, 32b to engage threads in the first set of holes and fix the cradle portion 20 to the shell 12. Rail cover members 36a, 36b each have one lateral extremity 36c, 36d bolted against a corresponding foot portion 18a, 18b of the base, and provide means to conceal bolt shafts or shanks 38a, 38b. These members are anchored at lateral extremities 36e, 36f by hooking over a corresponding bolt shaft 38a, 38b. The bolts or shafts 38a, 38b run axially of the machine near the outer periphery of the shell 12 in the region of each leg portion 22a, 22b and secure end frames or covers 40 of the machine against the open ends of the shell 12 (see FIG. 2).

When the base assembly 10 is fastened to the mounting surface 16 at the foot portions 18a, 18b, by the bolt members 30a, 30b, and the machine shell 12 is seated firmly against the cradle portion 20, the leg portions 22a, 22b maintain the axial center line of the arcuate surface 24 (i.e. the line about which the arcuate surface 24 is symmetrical) a preset height h above the mounting surface 16. The preset height h is such that the axis of the machine rotor shaft 14 will be at the selected height H parallel to the mounting surface 16.

According to the invention, the flat foot portions 18a, 18b, are capable of being drawn to increase the preset height h a sufficient amount so that the axis of the rotor shaft 14 will extend a second selected height over the mounted surface 16, which second height H is greater than the first selected height H.

For example, for the 112S/112M FR IEC Standard, a first preset height h can be in the range of from about 6.49 mm to about 6.95 mm. For the 182/184 FR NEMA Standard, a second preset height h may be in the range of from about 8.6 mm to about 9.24 mm. The precise value for the preset height h for a particular standard will depend on the radius of curvature of the arcuate surface 24 and the thickness of the material forming the integral metallic sheet of the base assembly 10.

Figure 2:
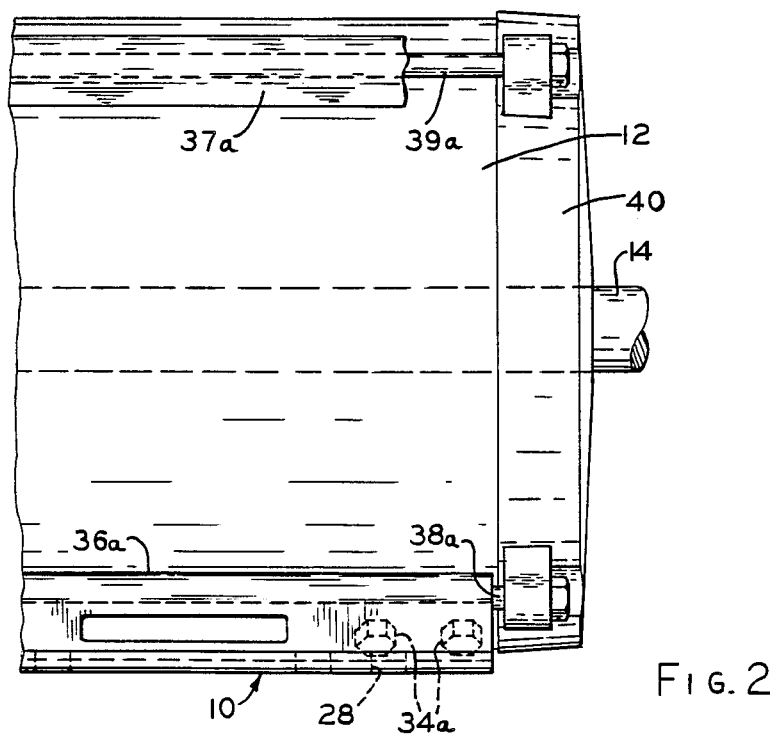
FIG. 2 is a side view of an end portion of the base assembly and machine in FIG. 1.
Figure 3:
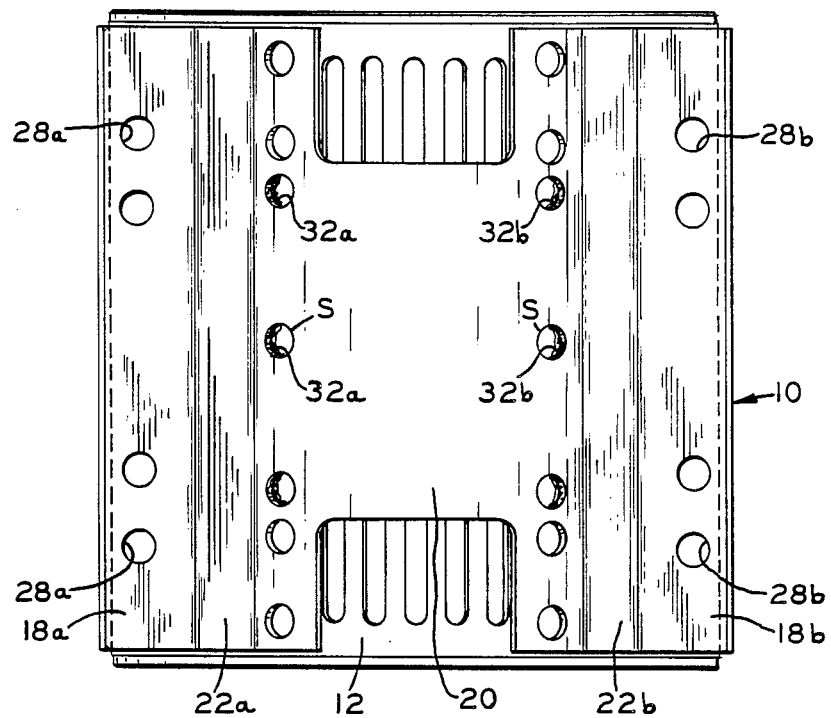
FIG. 3 is a plan view of the base assembly, as seen from underneath the machine in FIG. 1.
Figure 4:
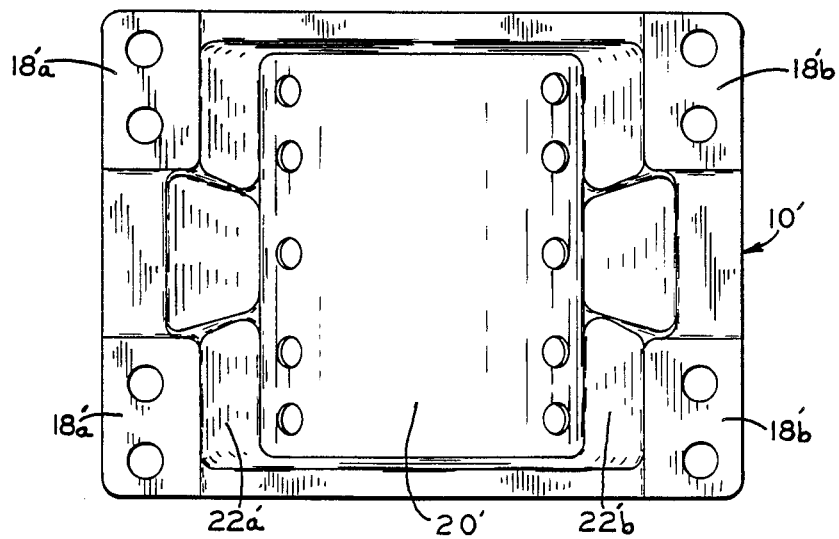
FIG. 4 is a plan view of a second embodiment for the base assembly as seen looking upward from a mounting surface.
Figure 5:
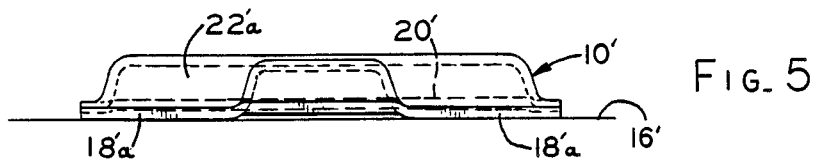
FIG. 5 is a side view of the base assembly of FIG. 4.

For the configuration of base assembly 10, shown in FIGS. 1-3, it is preferred that the integral metallic sheet be made from low carbon steel and have a thickness of about 5.00 mm. For the mentioned IEC Standard, the first preset height h is preferably in the range of from about 6.49 mm to about 6.85 mm. For the mentioned NEMA Standard, leg portions 22a, 22b, should be drawn so that the second preset height h is in the range from about 8.66 mm to about 9.02 mm.

The second mounting holes 28a, 28b in the flat foot portions 18a, 18b are oversized, so that they will match either one of the standard bolt hole configurations.

For the sake of convenience for the ultimate user, dynamo-electric machines can be provided with the base assembly 10 already fixed to the machine shell 12, and the base assemblies can be removed for substitution of C-face or D-flange type end shields on the machines with little resultant damage to the machine shells or casings. Specifically, as shown in FIG. 3, and according to the invention, some of the third set of mounting holes 32a, 32b in the cradle portion 20 overlie parts of the shell 12. The cradle portion 20 is paddle welded to the shell 12 through at least some of the third set of mounting holes 32a32b, in a manner to allow the welds to be cut with a milling tool and the cradle portion 20 to be separated from the shell when the mentioned substitution is desired. It is preferred that the cradle portion 20 be welded both to the shell 12 and to the machine stator encased in the shell through at least one of the third set of mounting holes in the cradle portion 20. As shown in FIG. 3, the pair of mounting holes 32a, 32b marked S and located medially of the axial ends of the base assembly 10 are provided in the cradle portion 20 to allow spot or puddle welding of the cradle portion to the machine shell and the encased stator core.

A second embodiment of a base assembly 10' according to the invention is shown in FIGS. 4-7. Parts corresponding to those of the embodiment in FIGS. 1-3 are indicated with similar reference numerals.

Figure 6:
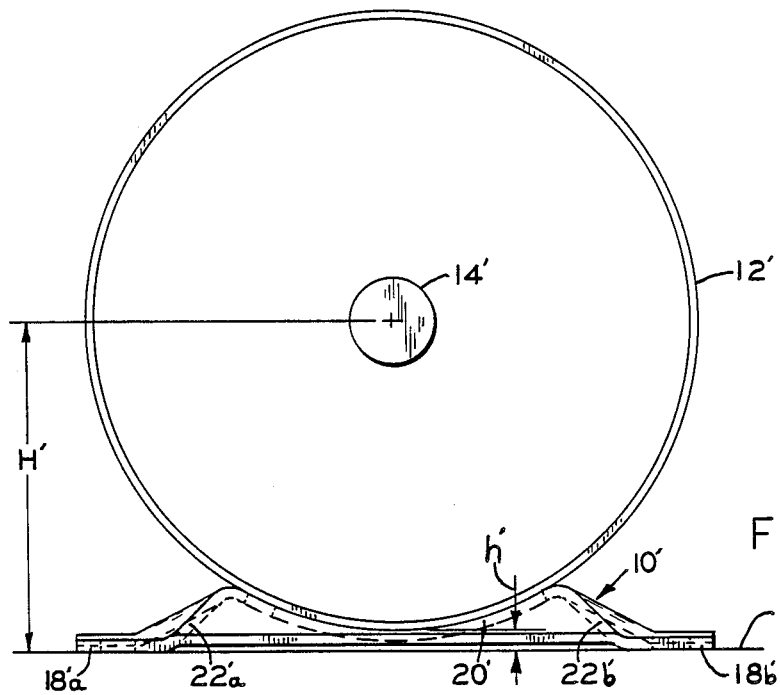
FIG. 6 is an end view of the base assembly in FIG. 4 showing a cradle portion supported above a mounting surface by a first preset height.

The base assembly 10' preferably is formed of low carbon steel with a thickness of about 3.80 mm. The first preset height h' then may be in the range of from about 6.80 mm to about 6.95 mm for the mentioned IEC Standard. An end view of the base assembly 10' when in the IEC configuration is shown in FIG. 6.

Figure 7:
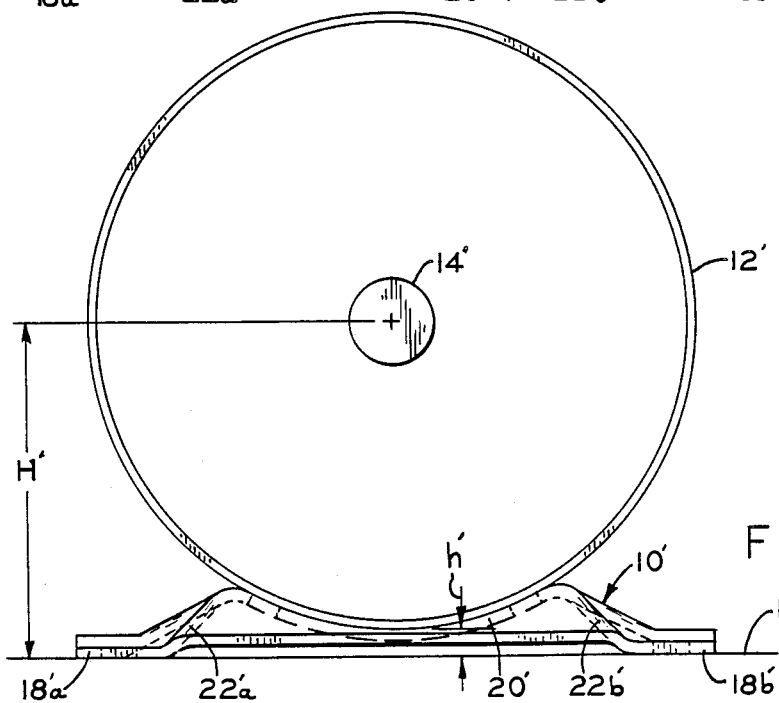
FIG. 7 is an end view of the base assembly in FIG. 4, showing the cradle portion supported at a second preset height above the mounting surface.

To meet the mentioned NEMA Standard, the foot portions 18a, 18b are drawn to result in the configuration shown in FIG. 7. Here, the second preset height h' is preferably in the range of from about 8.84 to about 9.24 mm.

Bolt covers 37a, 37b, shown in FIGS. 1 and 2, are sized to snap fit on bolts 39a, 39b to form a cover over such bolts. The covers are sized to tightly fit against the motor structure in order to prevent objectionable vibration noise during operation of the dynamo-electric machine. Bolt covers 37a, 37b may be made of extruded plastic or formed sheet metal, such as, for example, sheet steel as shown in FIG. 1. Bolt covers 37a, 37b may not be used in those cases where covers over the through bolts are not desired. Moreover, covers 36a, 36b may be optionally omitted if desired.

Referring to FIG. 1, angles α are 37 degrees, 30 minutes for the location of bolts 38a, 38b and 39a, 39b. Location of bolts 38a, 38b at this angle ensures adequate clearance for mounting bolts 30a, 30b during insertion of such bolts into oversized holes 28a, 28b for both IEC and NEMA applications. Thus, the combination of oversized holes 28a, 28b permit the use of the same base for a given motor that will satisfy both NEMA and IEC standard bolt hole configurations.

While the foregoing description represents preferred embodiments of the present invention, it will be obvious to those skilled in the art that various changes and modifications may be made, without departing from the true spirit and scope of the present invention.

I claim:

1. A base assembly for mounting a dynamo-electric machine firmly on a planar mounting surface having a selected one of two standard bolt hole configurations, the machine including a cylindrical shell surrounding a machine stator and having first mounting holes, and a rotor shaft, the axis of which is to extend parallel to and a first selected height above said mounting surface, said base assembly comprising a generally rectangular integral metallic sheet including:

flat foot portions at opposite edge regions of said sheet, said flat foot portions having oversize second mounting holes for matching either of said two standard bolt hole configurations in said mounting surface and for receiving bolt members to fix the foot portions to said mounting surface;

a cradle portion intermediate the foot portions and having a arcuate surface conforming to a portion of the outer circumference of the machine shell including said first mounting holes, said arcuate surface being symmetrical about a center line drawn parallel to the shell axis, said cradle portion having a set of third mounting holes for aligning with at least some of said first mounting holes to enable the machine shell to be seated and fixed on said cradle portion, and leg portions each included upwardly from a corresponding foot portion in a direction toward the axis of said shell and joining with axially extending ends of said cradle portion to support the center line of said arcuate surface a first preset height above the mounting surface, wherein the axis of said rotor shaft is at said selected height when the machine shell is seated in said cradle portion, and wherein said flat foot portions of said metallic sheet are capable of being drawn to increase the height of said center line above the mounting surface to a second preset height, so that the axis of said rotor shaft will extend a second selected height over the mounting surface, said second selected height being greater than said first selected height.

2. The base assembly according to claim 1, wherein said first preset height is in the range of from about 6.49 mm to about 6.95 mm.

3. The base assembly according to claim 2, wherein said second preset height is in the range of from about 8.66 to about 9.24 mm.

4. The base assembly according to claim 1, wherein said metallic sheet is formed of steel, and has a thickness in the range of from about 3.80 mm to about 5.00 mm.

5. The base assembly according to claim 4, wherein the thickness of said metallic sheet is about 5.00 mm, said first preset height is from about 6.49 to 6.85 mm, and said second preset height is from about 8.66 to about 9.02 mm.

6. The base assembly according to claim 4, wherein the thickness of said metallic sheet is about 3.80 mm, said first preset height is from about 6.80 to about 6.95 mm, and said second preset height is from about 8.84 to about 9.24 mm.

7. A detachable base arrangement for a dynamo-electric machine, comprising:

a cylindrical shell for surrounding a machine stator and having first mounting holes; and a base member for mounting the machine on a planar mounting surface having a selected one of two standard bolt holes configurations, said base member comprising a generally rectangular integral metallic sheet including:

flat foot portions at opposite edge regions of said sheet, said flat foot portions having oversize second mounting holes for matching either of said two standard bolt hole configurations in said mounting surface, and for receiving bolt members to fix the foot portions to said mounting surface, a cradle portion intermediate the foot portions and having an arcuate surface conforming to a portion of the outer circumference of the machine shell including said first mounting holes, said cradle portion having a set of third mounting holes for aligning with at least some of said first mounting holes to enable the machine shell to be seated and fixed on said cradle portion;

wherein said cradle portion is welded to said shell through at least some of said third mounting holes in a manner to allow the welds to be cut with a milling tool and the cradle portion to be separated form the shell; and leg portions each inclined upwardly from a corresponding foot portion in a direction toward the axis of said shell and joining with axially extending ends of said cradle portion to support the cradle portion a certain height above said mounting surface.

8. The base arrangement according to claim 7, including bolts passing through unwelded ones of said third mounting holes to engage threads in said first mounting holes, for fixing said cradle portion to said shell.

9. The base arrangement according to claim 7, wherein said cradle portion is welded to said shell and to said stator through at least one of the three mounting holes.

10. The base arrangement according to claim 7, including a rotor shaft extending coaxially from said shell, and wherein the arcuate surface of said cradle portion is symmetrical about a center line drawn parallel to the shell axis, said leg portions are dimensioned to support the center line of said arcuate surface a first preset height above the mounting surface so that the axis of said rotor shaft extends parallel to and a first selected height above said mounting surface, and the flat foot portions of said metallic sheet are capable of being drawn to increase the height of said center line above the mounting surface to a second preset height, so that the axis of said rotor shaft will extend a second selected height over the mounting surface, said second selected height being greater than said first selected height.

11. The base arrangement according to claim 10, wherein said first preset height is in the range of from about 6.49 mm to about 6.95 mm.

12. The base arrangement according to claim 11, wherein said second preset height is in the range from about 8.66 mm to 9.24 mm.

13. The base arrangement according to claim 10, wherein said metallic sheet is formed of steel, and has a thickness in the range from about 3.80 mm to about 5.00 mm.

14. The base arrangement according to claim 13, wherein the thickness of said metallic sheet is about 5.00 mm, said first preset height is from about 6.49 to about 6.85 mm and said second preset height is from about 8.66 to about 9.02 mm.

15. The base arrangement according to claim 13, wherein the thickness of said metallic sheet is about 3.80 mm, said first preset height from about 6.80 to about 6.95 mm and said second preset height is from about 8.84 to about 9.24 mm.

* * * * *